United States Patent [19]
Hilland

[11] Patent Number: 5,130,881
[45] Date of Patent: Jul. 14, 1992

[54] IC SOCKET HAVING OVERVOLTAGE PROTECTION

[75] Inventor: David H. Hilland, Albuquerque, N. Mex.

[73] Assignee: The United States of Americas as represented by the Secretary of the Air Force, Washington, D.C.

[21] Appl. No.: 142,094

[22] Filed: Jan. 11, 1988

[51] Int. Cl.$^5$ .................... H02H 3/22; H02H 9/04
[52] U.S. Cl. ........................ 361/56; 361/91; 361/127; 361/393; 361/400; 174/52.4
[58] Field of Search ............ 361/56, 58, 91, 110, 361/111, 126, 127, 396, 392, 393, 421, 424, 412, 413, 400; 174/52 FP; 439/69, 70, 68, 620

[56] References Cited

U.S. PATENT DOCUMENTS

| | | | |
|---|---|---|---|
| 3,815,077 | 6/1974 | Anhalt et al. | 439/70 |
| 4,654,743 | 3/1987 | Ruehl et al. | 361/111 |
| 4,692,833 | 9/1987 | Chung | 361/91 |
| 4,739,440 | 4/1988 | Fujiki et al. | 174/52 FP |

*Primary Examiner*—A. D. Pellinen
*Assistant Examiner*—Todd E. DeBoer
*Attorney, Agent, or Firm*—Donald J. Singer; Jacob N. Erlich

[57] ABSTRACT

An IC socket having internal MOV devices for protecting an integrated circuit from damage due to transient overvoltages.

Each MOV device is coupled between a lead of the socket and a common metallic grounding strip contained within the IC socket. The grounding strip has an output lead which is brought through the socket for connection to a convenient system grounding point.

5 Claims, 1 Drawing Sheet

IC SOCKET HAVING OVERVOLTAGE PROTECTION

STATEMENT OF GOVERNMENT INTEREST

The invention described herein may be manufactured and used by or for the Government for governmental purposes without the payment of any royalty thereon.

BACKGROUND OF THE INVENTION

The present invention relates to apparatus which protects integrated circuits from damage due to exposure to transient voltages of considerably higher levels than their normal operating voltages.

Overvoltage transients can and frequency do damage IC (integrated circuit) devices. Such IC devices are often housed in thin rectangular molded plastic containers having two rows of seven or more vertical leads, called dual in-line (DIP) packages. The leads may be inserted into holes in a printed circuit board and soldered to the underlying wire traces of the board. Quite often, however, the leads of a dual in-line IC package are instead plugged into a matching dual in-line socket which in turn has its leads soldered to the printed circuit board of an electronic system. In this manner, the IC device can be quickly and easily installed or removed from the system.

The present technology for protecting such IC devices from damage caused by high voltage transients involves the use of shielding, filters, and voltage clamping components such as either metal oxide varistors (MOV's) or Zener diodes installed directly onto the printed circuit boards of the electronic system. Because of cost factors and space limitations however, discrete MOV devices and Zener diodes are normally used to protect only the most critical components of the electronic system, leaving the remaining components unprotected and therefore subject to damage from such transients.

Metal oxide varistors are two terminal non-linear devices used to clamp a circuit node at a specified maximum voltage. They have the capability of shunting substantially more energy than Zener diodes, and are therefore a more suitable device for providing electrical transient protection. Until recently however, MOV devices having sufficiently low clamping threshold voltages for protecting low operating voltage components, such as IC devices, were not readily available. Typical IC devices may have operating voltages in the order of five volts, and may be damaged when subjected to transient or sustained potentials in excess of thirty volts. Now it is possible to manufacture MOV devices having clamping voltages of 8.2 volts or 12 volts, for example, making MOV devices very attractive devices for the protection of IC devices from overvoltage transients.

OBJECTS AND SUMMARY OF THE INVENTION

It is therefore the primary object of the present invention to provide improved apparatus for decreasing the susceptibility of an electronic component to failure from electrical transients.

It is another object of the present invention to provide apparatus for diverting transient energy from an integrated circuit.

It is a more specific object of the present invention to provide an IC socket having an overvoltage transient shunting capability.

In accordance with the present invention, a plurality of voltage clamping devices, such as MOV devices, are integrated within an IC socket. Each MOV device is coupled between a lead of the IC socket and a common metallic grounding strip contained within the IC socket. The grounding strip has an output lead which is brought through the socket for connection to a convenient system grounding point.

The foregoing and other objects, advantages and features of the present invention will become apparent from the following detailed description of the preferred embodiment thereof, as illustrated in the accompanying drawings.

DETAILED DESCRIPTION OF THE INVENTION

Figure 1:
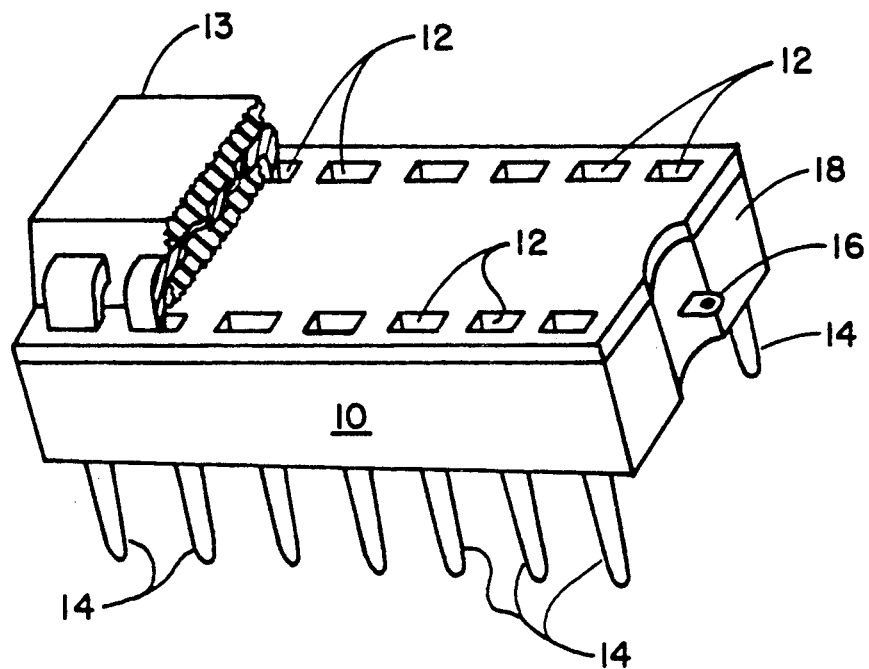
FIG. 1 is a pictorial view of an IC socket constructed in accordance with the teachings of the present invention.

FIG. 1 of the drawings illustrates a seemingly conventional IC socket 10 of the type having slots 12 in which are disposed leads 14 which bear against the leads of an IC device 13 inserted into socket 10. Leads 14 are normally soldered to the wiring traces of a printed circuit board. Unlike a conventional IC socket however, socket 10 also has an additional lead 16 protruding from the side 18 thereof. This additional lead 16 is a part of a grounding strip contained within the IC socket. The function and construction of this grounding strip are disclosed in detail as this description proceeds.

Figure 2:
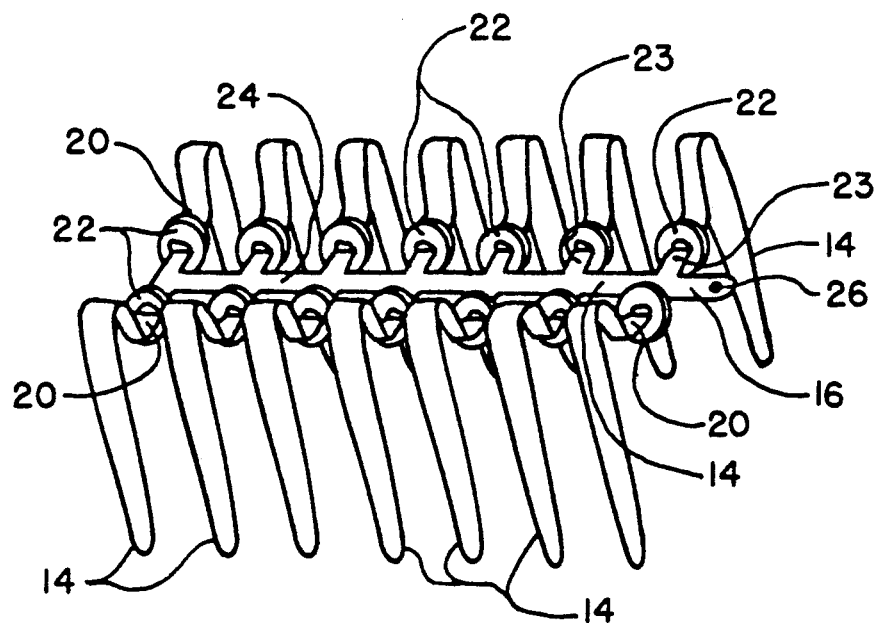
FIG. 2 is a pictorial view of the leads, voltage clamping devices, and grounding strip within the IC socket of the present invention.

FIG. 2 illustrates the shape of leads 14 within socket 10. Each lead 14 has its internal end 20 connected to one terminal or lead of an associated MOV device 22. Each MOV device 22 has its other terminal connected to a branch 23 extending orthogonally from a centrally located metallic grounding strip 24. Overvoltage transient grounding lead 16 extends from one end of grounding strip 24 and is of sufficient length to protrude through socket 10.

Leads 14 and grounding strip 24 may each be fabricated on a punch press as separate components which are thereafter held in a form while the MOV devices 22 are soldered therebetween. This assembly is then inserted into and sealed within IC socket 10. As previously mentioned, IC socket 10 has the external ends of its leads 14 soldered to appropriate wiring traces of a printed circuit board, and lead 16 is electrically connected, preferably by conventional wire of circular cross section, to a transient voltage grounding point of the system. A hole 26 may be formed through lead 16 for securing the transient voltage grounding wire.

The overvoltage transient protection device operates as follows: a transient overvoltage, e.g. 100 volts, which is greater than the clamping voltage of the MOV device, e.g. 40 volts, travels through the power supply, the signal lines etc., of an associated electronic system, and appears on a particular lead 14 of IC socket 10. The related MOV device 22, which is essentially an open circuit having a small capacitance in its "off" state, begins to conduct current and clamps the overvoltage at the clamping voltage of the MOV device 22. The MOV device 22 continues to shunt current away from the integrated circuit installed in socket 10 until the transient has ended.

Each MOV device 22 shunts current from its respective lead 14 to the common ground strip 24 and thence to a system ground via lead 16 without using a printed circuit path. This design can be implemented for IC sockets having any number of leads, and some applications may require only that the leads 14 which are associated with the ground and power leads of socket 10 be protected. The particular clamping voltage of an MOV device 22 is chosen to suit the particular application, but will usually be 30 to 40 volts. One such MOV device having a voltage clamping level of 33 volts may be obtained from The General Electric Company as their part V33MA1A.

The shape and material of IC socket 10, and the dimensions of its leads 14, their separation, metal gauge, and metal material are all well known to IC socket manufacturers and need not be specified in detail herein, the uniqueness of this invention being the provision of transient voltage protection within the IC socket.

This invention can be fabricated with any number of MOV devices 22 to fit any number of leads 14. The clamping voltage and energy rating of each MOV device 22 can be varied to fit numerous applications. Zener diodes could in certain instances be substituted for MOV devices to reduce the parasitic capacitance on leads 14 if low energy high voltage transients were the only threads expected.

While the invention has been described with reference to a particular embodiment thereof, it will be understood by those skilled in the art that the invention is capable of a variety of alternative embodiments that come within the spirit and scope of the appended claims.

What is claimed is:

1. Apparatus for protecting an enclosed electronic device against damage from overvoltages comprising:
   a socket having a plurality of slots therein aligned in two parallel rows for receiving the external leads of said electronic device;
   said socket further having a plurality of leads, each of said plurality of leads having a first end terminating within said socket, a second end extending through and protruding from said socket, and a surface intermediate said first end and said second end positioned within said socket below one of said plurality of slots to bear against an external lead of an electronic device;
   grounding means disposed within said socket between said two parallel rows of slots and having a portion thereof extending through said socket to provide an overvoltage transient grounding lead on an exterior surface of said socket;
   and a plurality of voltage clamping means disposed within said socket for clamping external leads of the electronic device at a specific maximum voltage, each of said plurality of voltage clamping means being coupled between said grounding means and said first end of one of said plurality of leads of said socket.

2. Apparatus as defined in claim 1 wherein each of said plurality of voltage clamping means comprises a metal oxide varistor device.

3. Apparatus as defined in claim 2 wherein said grounding means comprises a substantially flat metallic grounding strip positioned between said two parallel rows of slots and having a plurality of metallic branches, each of said branches extending orthogonally from said strip towards one of said plurality of slots.

4. Apparatus as defined in claim 3 wherein an electronic device to be protected is an integrated circuit housed in a dual in-line package, and wherein each said metal oxide varistor device is soldered between said first end of one of said plurality of leads of said socket and the distal end of one of said plurality of metallic branches.

5. Apparatus as defined in claim 1 wherein each of said plurality of voltage clamping means is a Zener diode.

* * * * *